March 21, 1967 — W. S. PEPPLER — 3,309,835
METHOD AND APPARATUS FOR PRODUCING PACKAGES WITH A HEAT-SHRINK FILM
Filed Jan. 23, 1964
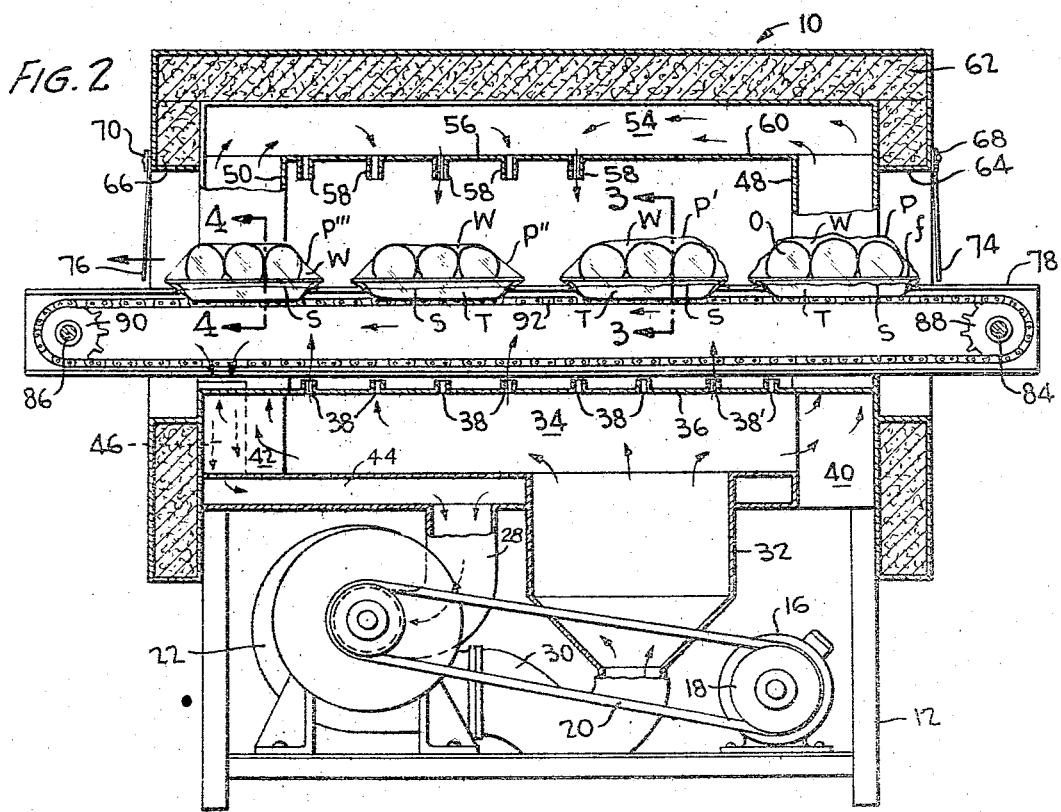
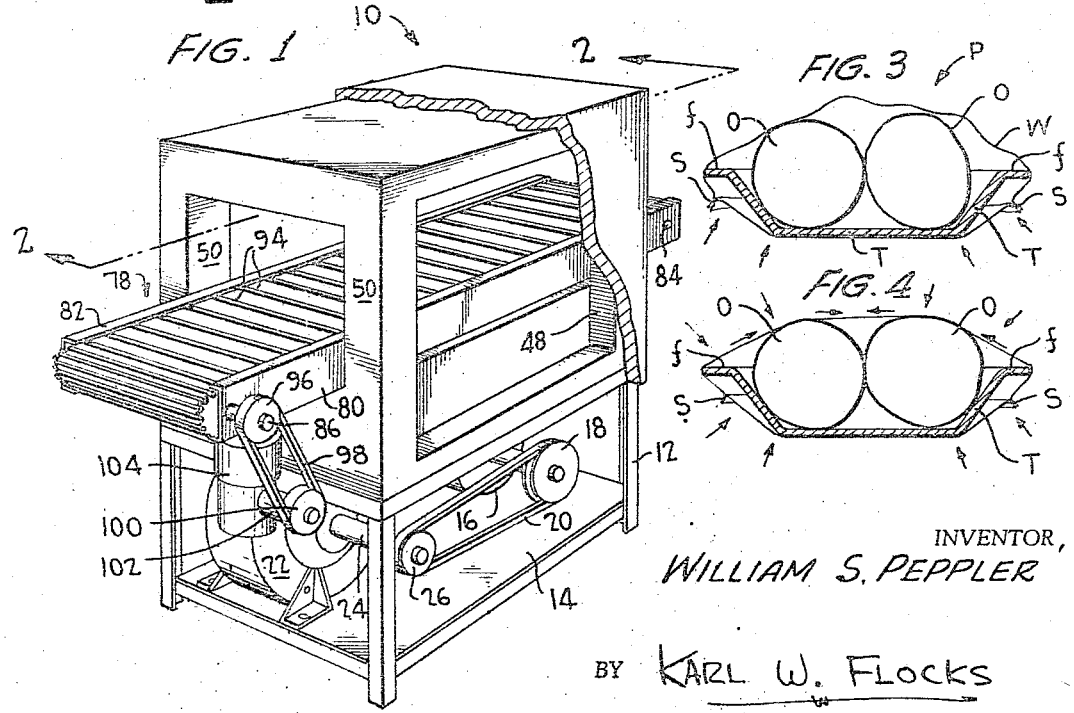
INVENTOR,
WILLIAM S. PEPPLER
BY KARL W. FLOCKS
ATTORNEY

United States Patent Office 3,309,835
Patented Mar. 21, 1967

3,309,835
METHOD AND APPARATUS FOR PRODUCING PACKAGES WITH A HEAT-SHRINK FILM
William S. Peppler, Chappaqua, N.Y., assignor to Diamond International Corporation, a corporation of Delaware
Filed Jan. 23, 1964, Ser. No. 339,651
3 Claims. (Cl. 53—30)

This invention relates generally to methods and apparatus for producing packages, and more particularly to packages having a heat-shrunk film forming the outer wrapping thereof.

Certain films, polystyrene, for example, have been found to be difficult to weld at times; particularly, the weld lines sometimes tend to become weak structurally and thus constitute a common source of package failure.

The method and apparatus of this invention is particularly adapted for use in producing the packages wrapped on the apparatus disclosed in the copending U.S. application Ser. No. 215,414 filed Aug. 7, 1962, now U.S. Patent No. 3,184,896. The wrapper disposed about trays in the just mentioned application, are relatively loose and will generally be welded peripherally about the tray forming the base of the package.

A primary object of the present invention is to provide novel apparatus and a method for producing a package in which welds of the wrapper are initially shrunk to a relatively protected position beneath the peripheral flange of a base tray or element upon which the package is formed whereby subsequent shrinkage of the film and the resulting tension caused by the shrinking wrapper will be minimized or absorbed at the relatively strong flange of the base tray element rather than being imposed on the weld of the package wrapper.

Another object of the present invention is to provide a method utilizing a film-shrinking tunnel wherein a portion of a shrinkable wrapper is selectively shrunk in a position to orient certain portions of the wrapper in a position wherein the tension imposed on portions susceptible to failure will be minimized to accordingly eliminate an element that might lend itself to package failure.

A still further object of the present invention is to provide a heat shrink tunnel and method utilizing nozzles impinging blasts of hot air upon a heat shrinkable film to selectively shrink critical portions of the film.

A more specific object of the present invention is to provide a method and apparatus wherein a heat shrinkable film is initially shrunk at the bottom of the package to dispose weld lines thereon in a protected position beneath the lip of a molded or base tray and then hot air is subsequently directed to both the top and the bottom of the package without substantial exposure of the weld lines to the shrinking heat.

These together with other and more specific objects and advantages of the invention will become apparent from a consideration of the following specification and the drawings forming a part thereof, wherein:

FIG. 1 is a perspective view of a film-shrinking tunnel with portions of the insulating covering being broken away in order to show details;

FIG. 2 is an enlarged vertical section taken substantially on the plane of line 2—2 of FIG. 1;

FIG. 3 is an enlarged vertical section taken substantially on the plane of line 3—3 of FIG. 2, and showing the general relationship of the tray product being packaged and the wrapper weld with respect to the tray flange; and FIG. 4 is a view similar to FIG. 3 taken substantially on the plane of line 4—4 of FIG. 2 and showing the manner in which the wrapper weld is protectively disposed beneath the tray flange.

Referring to the drawing in detail, the shrink tunnel is indicated generally at 10 and comprises a substantially rectangular support base 12 having a lower support panel 14. The support panel 14 includes thereon a motor or power source 16 having a drive pulley 18 over which is entrained an endless belt 20. The plate 14 supports a blower assembly 22 which includes a suitable rotor (not shown) having a lateral shaft 24 and a drive pulley 26 upon which the flexible belt 20 is entrained. The blower will incorporate suitable means for heating air, i.e. electrically or by means of gas burners, and the housing thereof includes a return 28 and an outlet 30. The outlet 30 communicates with a funnel shaped chamber 32 opening into a substantially rectangular lower plenum chamber 34. The plenum chamber 34 includes an upper plate 36 having longitudinally spaced therealong and transversely thereacross a plurality of jet nozzles 38 for directing blasts of hot air onto the lower surface of packages having a film to be shrunk, as will subsequently be described in detail. The plenum chamber 34 communicates at opposite ends with transverse front and rear passages 40 and 42, respectively.

The return or inlet 28 communicates with a chamber 44 which is connected to a vertically extending passage 46 which opens adjacent the outlet or rear end of the heat shrink tunnel for salvaging hot air for return to the blower for subsequent reheating and recirculation through the heat tunnel.

The heat shrink tunnel comprises front and rear hollow, vertically extending posts 48 and 50 which respectively communicate with the chambers 40 and 42 and which are connected to a substantially rectangular upper plenum chamber 54. The plenum chamber 54 is formed by an upper plate 56 which includes a plurality of downwardly directed jet nozzles 58, it being noted that the plate 56, as indicated at 60, is blank and does not include nozzles 58 at the initial upper portion of the tunnel to accordingly permit the upwardly directed jet nozzles 38' only, to initially direct a blast of shrinking air to the under side of the packages P-P''' being moved through the heat shrink tunnel.

The tunnel 10 is covered by a rectangular insulating housing 62 having an ingress portion 64 opening between the legs 48, and an egress portion 66 opening between the legs 50. Suitably secured on the front and rear faces of the tunnel as indicated at 68 and 70, respectively, and depending in overlying relationship to the ingress and egress thereof, are a plurality of elongated, flexible strap elements 74 and 76 which form a baffle to aid in confining heated air within the tunnel so heat losses will be minimized.

Extending transversely through the ingress and egress 64 and 66 and suitably supported between the jets 38, 38' and 58 is an elongated conveyor indicated generally at 78. The conveyor 78 will be in line with the conveyor of the previously mentioned pending application, to receive therefrom packages which have a loose heat shrinkable wrapper thereabout. The conveyor 78 comprises a pair of inwardly opening support channels 80 and 82 which have extending transversely there across at opposite ends front and rear support shafts 84 and 86 on which are mounted sprockets 88 and 90, respectively. Entrained over the sprockets 88 and 90 are a pair of transversely spaced endless chains 92 (only one being shown) which have connected thereto a plurality of transversely support slats 94. The shaft 86 has connected thereto a driven pulley 96 over which is entrained a flexible drive belt 98 connected to a pulley 100 mounted on a laterally projecting shaft 102 of a motor 104 mounted on the heat shrink tunnel.

The package P comprises a base element or tray T which have a peripheral, outwardly extending flange f.

Disposed in the is a product O comprising oranges, apples, etc., and wrapped about the tray and product is a wrapper W. As previously mentioned, the wrapper W will have a peripheral seal or weld S generally extending about the entire periphery of the package.

Considering FIGS. 2 and 3, as the package P is initially conveyed into the ingress 64, the seals or welds S will be disposed generally below and outwardly from the peripheral flange f of the tray T. The jet nozzles 38' will direct a blast of hot shrinking air to the undersurface of the wrapper accordingly causing the seals or welds S to move inwardly and below the flange f, see for example package P' of FIG. 2. The next position of the package as indicated at P" results in jets of hot shrinking air being directed toward the package from both the upper and lower plenum chambers 54 and 34, however, the seals or welds S; see FIG. 4, will be disposed below and in protected relationship beneath the flange f of the tray and thus shrinking tension extending over the top of the package from the flange f, as indicated by the direction arrows in FIG. 4, will not be imposed on the welds disposed beneath the flange f, but the tension will generally be imposed on the relatively rigid flange of the tray T. The package then moves to the position indicated by the package P''' and then out of the egress 66 of the shrink tunnel, it being noted that as the package P''' moves out of the heat shrink tunnel, air is being drawn at 46 back into the blower 22 for recirculation within the shrink tunnel.

Comparing the packages P–P''' of FIG. 2, it will be noted that the wrapper is substantially loose at P, the undersurface and weld S are shrunk in the package P' both the upper and lower surfaces of the package P" are engaged by a blast of hot air at which time the weld S is protected beneath the peripheral flange of the tray T and tension imposed by the upper shrinking portion of the wrapper, is absorbed by the peripheral flange f of the tray rather than by the weld S of the wrapper thus obviating package damage during handling, etc.

Obviously, many modifications may be made without departing from the basic scope of the present invention, and therefore, within the scope of the appended claims, the invention may be practiced other than has beeen specifically described.

What is claimd is:

1. The method for producing a package comprising a peripherally flanged tray, a product therein, and a tensioned heat-shrunk film wrapper circumposed thereabout and including wrapper seals disposed beneath the peripheral flange of the tray, comprising the steps of:
    (a) circumposing a loose, heat-shrinkable wrapper about a peripherally flanged tray filled with a product and orienting seals of said loose wrapper in a position below a plane passing through the peripheral flange of said tray;
    (b) continuously conveying said tray and wrapper thereabout through a predetermined path of travel within an enclosing tunnel;
    (c) directing a blast of hot air, while said tray and wrapper are conveyed, only from beneath said tray and conveyor and upwardly toward the under surface of said tray and wrapper while leaving the upper surface of said tray and wrapper exposed, and shrinking said wrapper so that the wrapper seals are disposed within an area spaced from and inwardly below said tray peripheral flange; and
    (d) directing a blast of hot air simultaneously only toward the upper and lower surfaces of said tray and wrapper while said tray and wrapper are being conveyed whereby said wrapper is finally shrunk and said wrapper is formed without excessive tension being imposed on said wrapper seals and accordingly inhibiting rupture of said wrapper seals.

2. Apparatus for selectively shrinking a package wrapper and producing a package comprising:
    an insulated tunnel haivng an ingress and egress,
    said tunnel having upper and lower plenum chambers, respectively, including lower and upper flat plates bordering lower and upper portions of said tunnel intermediately of said ingress and egress,
    said lower plate including a plurality of upwardly directed nozzles communicating with said lower plenum chamber and extending substantially the length of said tunnel and transversely of said tunnel from said ingress to said egress,
    said upper plate including a plurality of downwardly directing nozzles communicating with said upper plenum chamber and extending transversely of said tunnel, said upper plate including an imperforate portion between said tunnel ingress and said downwardly directed nozzles,
    said nozzles comprising the only means of communication from said plenum chambers into said tunnel, and
    conveyor means extending through said tunnel from said ingress to said egress and immediately overlying said upper plate of said lower plenum chamber, said conveyor including portions permitting the passage of hot, pressurized air upwardly therethrough, said conveyor including an upper run disposed substantially beneath said downwardly directed nozzles whereby an article disposed on said upper conveyor run, while passing the tunnel portion in which said imperforated plate portion is located, will have hot air impinged thereon only from said upwardly directed nozzles, and hot air will be impinged on both the upper and lower surfaces of the article during its entire passage through said tunnel after passing said imperforate plate portion.

3. The structure as claimed in claim 2 in which said tunnel comprises hollow corner posts connected between said plenum chambers, blower means connected to said lower plenum chamber for moving hot pressurized air into said lower plenum chamber, through said corner posts and into said upper plenum chamber, and an inlet in direct communication with said lower means immediately adjacent said tunnel egress whereby a substantial portion of the hot air is salvaged at said tunnel egress and recirculated by said blower means.

References Cited by the Examiner

UNITED STATES PATENTS

| | | | |
|---|---|---|---|
| 3,060,655 | 10/1962 | Dreyfus | 53—30 |
| 3,120,728 | 2/1964 | Snow, et al. | 53—184 XR |
| 3,197,940 | 8/1965 | Spangler | 53—42 XR |
| 3,222,800 | 12/1965 | Siegel et al. | 53—184 XR |

FRANK E. BAILEY, *Primary Examiner.*

P. H. POHL, R. J. ALVEY, *Assistant Examiners.*